United States Patent
Owada (10) Patent No.: US 6,636,699 B2
(45) Date of Patent: Oct. 21, 2003

(54) FOCUS DETECTION DEVICE AND DISTANCE MEASUREMENT DEVICE

(75) Inventor: Mitsuru Owada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/900,952

(22) Filed: Jul. 10, 2001

(65) Prior Publication Data

US 2002/0006281 A1 Jan. 17, 2002

(30) Foreign Application Priority Data

Jul. 12, 2000 (JP) .................................. 2000-211690

(51) Int. Cl.⁷ ................................................ G03B 13/36

(52) U.S. Cl. ...................................................... 396/104

(58) Field of Search ............................. 396/104, 106, 396/111, 125, 89

(56) References Cited

U.S. PATENT DOCUMENTS

| | | | | |
|---|---|---|---|---|
| 4,602,861 A | * | 7/1986 | Taniguchi et al. | 396/104 |
| 4,749,848 A | | 6/1988 | Sorimachi | 250/201 |
| 4,916,302 A | | 4/1990 | Sorimachi | 356/1 |
| 6,222,996 B1 | * | 4/2001 | Nonaka | 396/104 |
| 6,350,976 B1 | * | 2/2002 | Higashino | 396/89 X |

* cited by examiner

Primary Examiner—W. B. Perkey
(74) Attorney, Agent, or Firm—Fitzpatrick, Cella, Harper & Scinto (57) ABSTRACT

A focus detection device includes a plurality of light receiving sensors having sensitivity characteristics such that their respective visible spectra have different wavelength regions, a focus detection circuit which performs focus detection based on an output of any one of the light receiving sensors, and a determination circuit which determines whether or not the focus detection result is appropriate. If the determination circuit determines that the result is not appropriate, the focus detection circuit performs focus detection based on the output of another light receiving sensor.

47 Claims, 8 Drawing Sheets

FOCUS DETECTION DEVICE AND DISTANCE MEASUREMENT DEVICE

BACKGROUND OF THE INVENTION

1. Field of Invention

The present invention relates to a focus detection device and a distance measurement device which are mounted on optical equipment such as a camera. The present invention provides the ability to obtain high-contrast object images and to perform excellent focus detection and distance measurement at all times.

2. Related Background Art

The technology for optically measuring distances to objects which exist in a plurality of directions is described in, for example, U.S. Pat. Nos. 4,749,848 and 4,916,302. This technology can allow a photographer to obtain distance distribution information and defocus quantity distribution information for objects which exist in an objective field and to recognize the placement of the objects in the objective field based on these types of distribution information.

According to this approach, a camera having CCD imaging elements or the like is used to take an image of the objects and a pair of resulting images having a parallax with respect to each other is used to perform well-known correlation calculations on the parallax images to determine a defocus quantity. In addition, distances to the objects with respect to each calculation area can be determined based on the principle of triangulation. Thus, these calculations can be performed equally on each area of the resulting images to obtain such distance and defocus quantity distribution information.

Alternatively, there has been conventionally known a focus detection device for a TTL camera. This is an automatic focus detection device which uses a so-called pupil splitting method to detect focusing conditions of an image-taking optical system from a relative deviation quantity of a plurality of object images generated by luminous fluxes from regions of each having a different pupil position in the image taking optical system. For example, this kind of autofocus device has been disclosed, which consists of an array pair, that is, a lens array positioned in the proximity of a primary image plane and an optical receiving element array positioned directly behind the lens array. Another example of this kind of autofocus device has also been disclosed, which consists of a field lens positioned on a primary image plane, two re-imaging lenses for re-imaging an image formed on the primary image plane onto a secondary image plane, and two image sensor arrays positioned on the secondary image plane.

Figure 6:
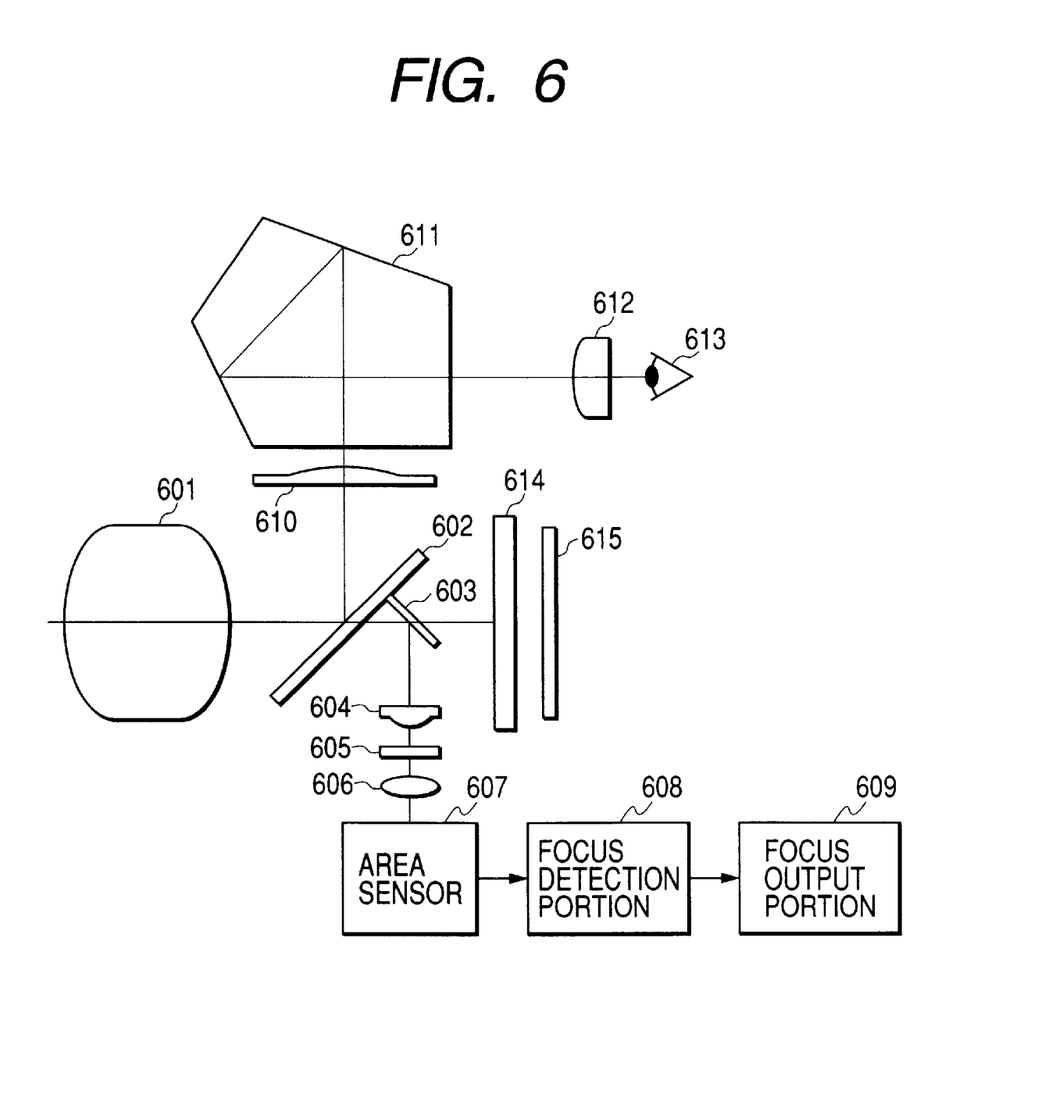
FIG. 6 is a block diagram for schematically showing a prior single-lens reflex camera.

Now, a prior art device will be described below with reference to FIG. 6.

Reference numeral 601 denotes an image taking lens, 602 denotes as quick return mirror, 603 denotes a sub-mirror, 604 denotes a field lens, 605 denotes a diaphragm, 606 denotes a secondary imaging lens, 607 denotes an area sensor, 608 denotes a focus detection portion, 609 denotes a focus output portion, 610 denotes a focus lens, 611 denotes a pentaprism, 612 denotes an eyepiece, 613 denotes a photographer's eye, 614 denotes a shutter curtain, and 615 denotes a film plane.

A part of the luminous flux passing through the image taking lens 601 is imaged on the area sensor 607 by the quick return mirror 602 and the sub-mirror 603 through the field lens 604, the diaphragm 605, and the secondary imaging lens 606. Here, the detailed configuration of the focus detection optical system will be described below in detail with reference to FIG. 7.

Figure 7:
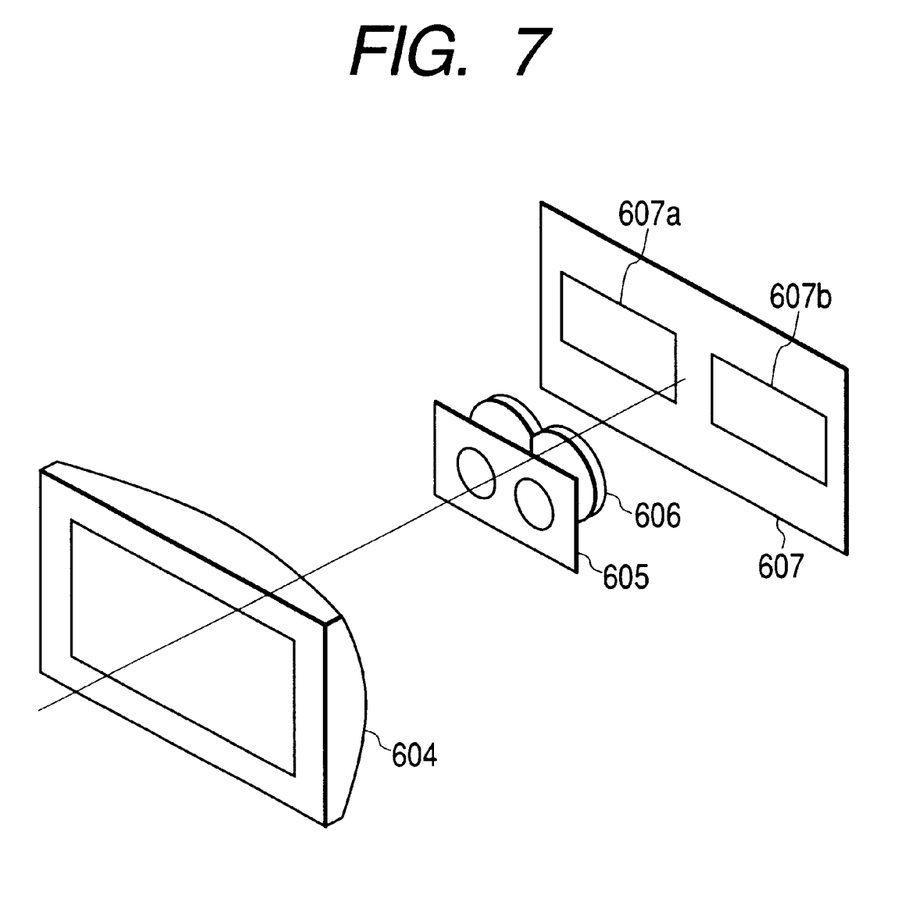
FIG. 7 is a perspective view for showing an optical system which performs focus detection through pupil splitting.

The luminous flux is guided respectively from different pupil positions of the image taking lens 601 onto two imaging screens 607a and 607b of the area sensor 607 to be reimaged under an imaging magnification determined by the field lens 604 and the secondary imaging lens 606. The area sensor 607 is positioned at a location optically equivalent to an image taking film plane with respect to the image taking lens 601 and imaging screens 607a and 607b have a field of view equal to a portion of an image taking screen or the image taking screen itself, respectively. The diaphragm 605 has a function of a diaphragm as well as that of an infrared cut filter, which removes undesired light.

The above-mentioned configuration can allow the imaging screens 607a and 607b to have a parallax of different pupil positions of a predetermined image taking lens. The imaging screens with this parallax are used to perform well-known correlation calculations on signals in opposed blocks in the focus detection portion 608 of FIG. 6 to determine a distance to an object in a previous block as well as a defocus quantity. For this purpose, it is preferable that a high-contrast image is used because the correlation calculations are performed to detect the quantity of displacement of the image. The correlation calculations cannot be performed correctly on a low-contrast image, for which the focus detection cannot be performed. This determination is performed on a predetermined block to obtain distance information or defocus quantity information and the result is provided by the focus output portion 609. Based on the provided result, the image taking lens 601 is driven to achieve a correct focal position for implementing autofocus.

The optical axis of the remainder of the luminous flux passing through the image taking lens 601 is bent by the quick return mirror 602 and the remainder of the luminous flux is guided through the focus lens 610, the pentaprism 611, and the eyepiece 612 to the photographer's eye 613 to be finally recognized as a field-of-view of an image for image taking.

Thereafter, by pressing a shutter release button, the quick return mirror 602, the submirror 603, and the shutter 614 are withdrawn to expose the film 615 (for taking the image).

The area sensor for focus detection usually has a sensitivity characteristic that it shows sensitivity over the entire visible spectrum. Since the area sensor performs sensitivity identification rather than color identification, it can produce outputs of the same level from inputs of different colors if they have the same sensitivity. This operation will be described below with reference to FIGS. 8A to 8C.

Figure 8A:
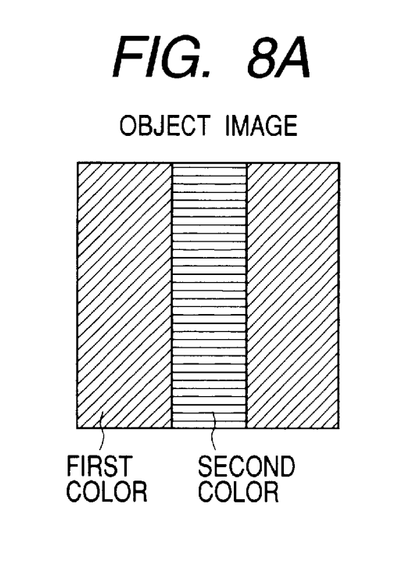
FIGS. 8A, 8B and 8C are several diagrams for explaining problems of the prior system.

FIG. 8A shows an example of an object for image taking and in the drawing, a first color is represented by oblique-line hatching and a second color is represented by horizontal-stripe hatching. In addition, it is assumed that the second color is located in the background for the first color and that the second color performs a higher-contrast image as compared with a stripe pattern of the first color.

Figure 8B:
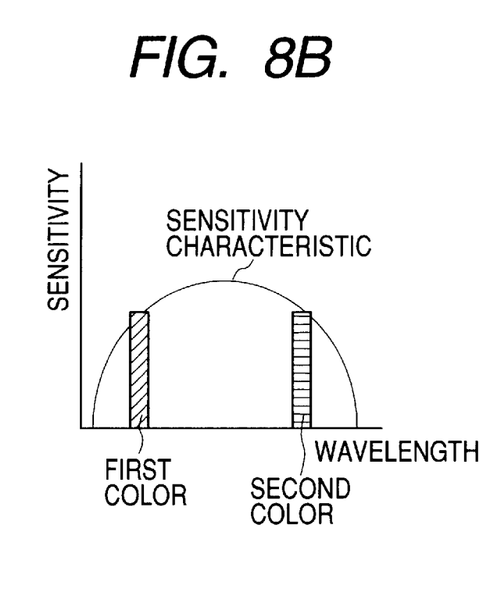

FIG. 8B shows wavelength as an axis of abscissa and sensitivity as an axis of ordinate for modeling the sensitivity characteristic of the area sensor for focus detection, which shows that the area sensor has a sensitivity characteristic that it shows sensitivity over the entire visible spectrum.

Figure 8C:
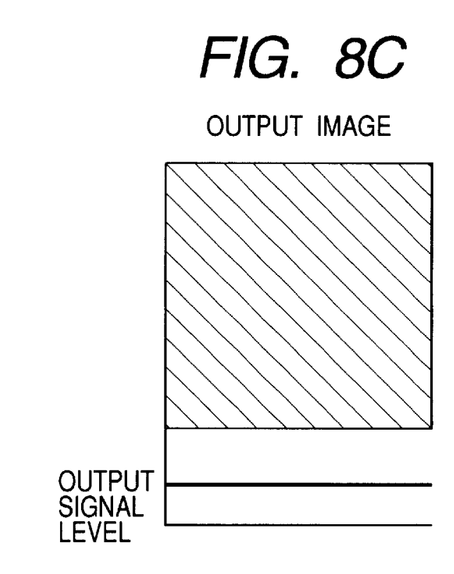

FIG. 8C shows an image obtained by the area sensor for focus detection when the first and second colors shown in FIG. 8A have the wavelength and sensitivity as shown in FIG. 8B, respectively. A graph in the lower portion of FIG.

8C shows an output level of the output image described above in one-dimensional representation. This indicates that the first and second colors have different wavelengths and that the same output level is produced due to the sensor's sensitivity characteristic.

There is still plenty of room for improvement in order to provide a focus detection device and a distance measurement device which provide the ability to obtain a high-contrast object image and to perform excellent focus detection or distance measurement operations at all times.

SUMMARY OF THE INVENTION

In one aspect, this invention has a plurality of light receiving sensors having different sensitivity characteristics, a focus detection circuit for performing focus detection based on the output of any one of the light receiving sensors, and a determination circuit for determining whether the focus detection result is appropriate, and if the determination circuit determines that the result is not appropriate, the focus detection circuit performs focus detection based on the output of another light receiving sensor. This provides the ability to perform focus detection from a high-contrast object image at all times, irrespective of the color of an object.

In another aspect, this invention has a plurality of light receiving sensors having different sensitivity characteristics, a distance measurement circuit for performing distance measurement based on the correlation among a plurality of pupil-split images obtained from the output of any one of the light receiving sensors or among a plurality of images with a parallax, and a determination circuit for determining whether the distance measurement result is appropriate, and if the determination circuit determines that the result is not appropriate, the distance measurement circuit performs distance measurement based on the output of another light receiving sensor. This provides the ability to perform distance measurement through correlation calculations of a high-contrast object image at all times, irrespective of the color of an object.

DESCRIPTION OF THE PREFERRED EMBODIMENTS

Figure 1:
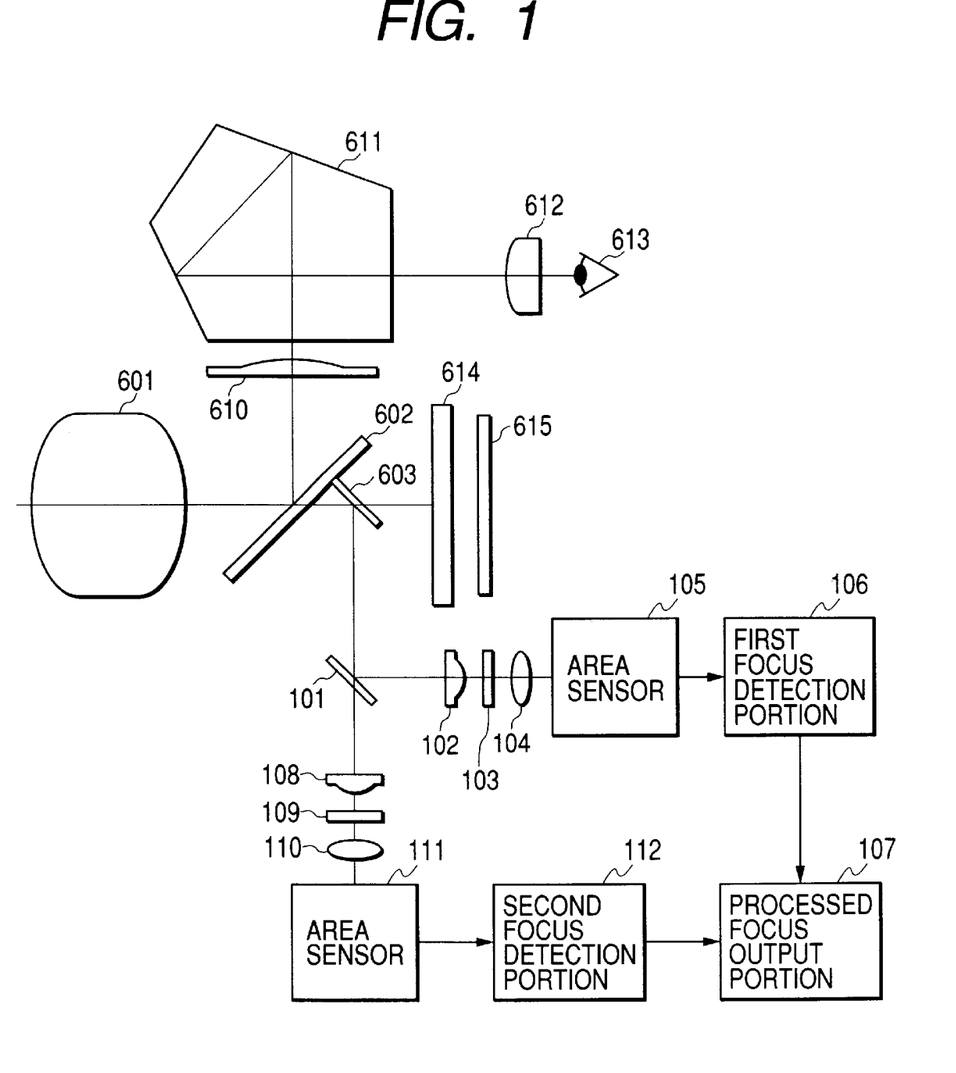
FIG. 1 is a block diagram for schematically showing a single-lens reflex camera according to each embodiment.

Now, the present invention will be described below in detail with reference to preferred embodiments.
First Embodiment FIG. 1 is a block diagram for schematically showing a single-lens reflex camera according to a first embodiment of the present invention. In FIG. 1, the same components as those in FIG. 6 have the same reference numerals and they will not be further described below.

In FIG. 1, reference numeral 101 denotes a half mirror for splitting a luminous flux into two parts, one having a bent optical axis and the other passing through straight ahead.

Reference numerals 102 and 108 denote field lenses, 103 and 109 denote diaphragms, 104 and 110 denote secondary imaging lenses, 105 and 111 denote area sensors, 106 denotes a first focus detection portion, 112, denotes a second focus detection portion, and 107 denotes a processed focus output portion.

An optical axis of a portion of the luminous flux passing through the image taking lens 601 is bent by the quick return mirror 602 and the sub-mirror 603 and the portion of the luminous flux is further split by the half mirror 101 into two parts, one of which is imaged on the area sensor 105 through the field lens 102, the diaphragm 103, and the secondary imaging lens 104. The image imaged on the area sensor 105 with different pupil positions is subject to well-known correlation calculations performed by the first focus detection portion 106 to obtain defocus quantity information of an object. The result is supplied to the processed focus output portion 107.

The other portion of the luminous flux split by the half mirror 101 is similarly imaged on the area sensor 111 through the field lens 108, the diaphragm 109, and the secondary imaging lens 110. Then, defocus quantity information of the object is obtained by the second focus detection portion 112 and the result is supplied to the processed focus output portion 107 in a similar manner as described above. The processed focus output portion 107 makes a determination on the information from the first focus detection portion 106 and the information from the focus detection portion 112 and any information which is determined to be appropriate will be provided as a focus detection result. Thereafter, based on the focus detection result, the image taking lens 601 is driven for focusing in a similar manner as that for the prior system.

As described later, first focus detection means consisting of a series of components from the field lens 102 to the first focus detection portion 106 and second focus detection means consisting of another series of components from the field lens 108 to the second focus detection portion 112 have their respective optical filters of different pass wavelength regions positioned in their respective optical paths, and thus, these focus detection means will have different sensitivity characteristics.

Alternatively, the element 106 may be replaced by a first distance measurement portion, the element 112, by a second distance measurement portion, and the element 107 by a processed distance output portion to perform similar operations.

The plurality of sensors having different sensitivity characteristics, that is, these focus detection means or these distance measurement means, can be used as described above to provide the ability to perform excellent focus detection of an object for which the focus detection cannot be performed by the prior system.

Figures 2A, 2B, 2C:
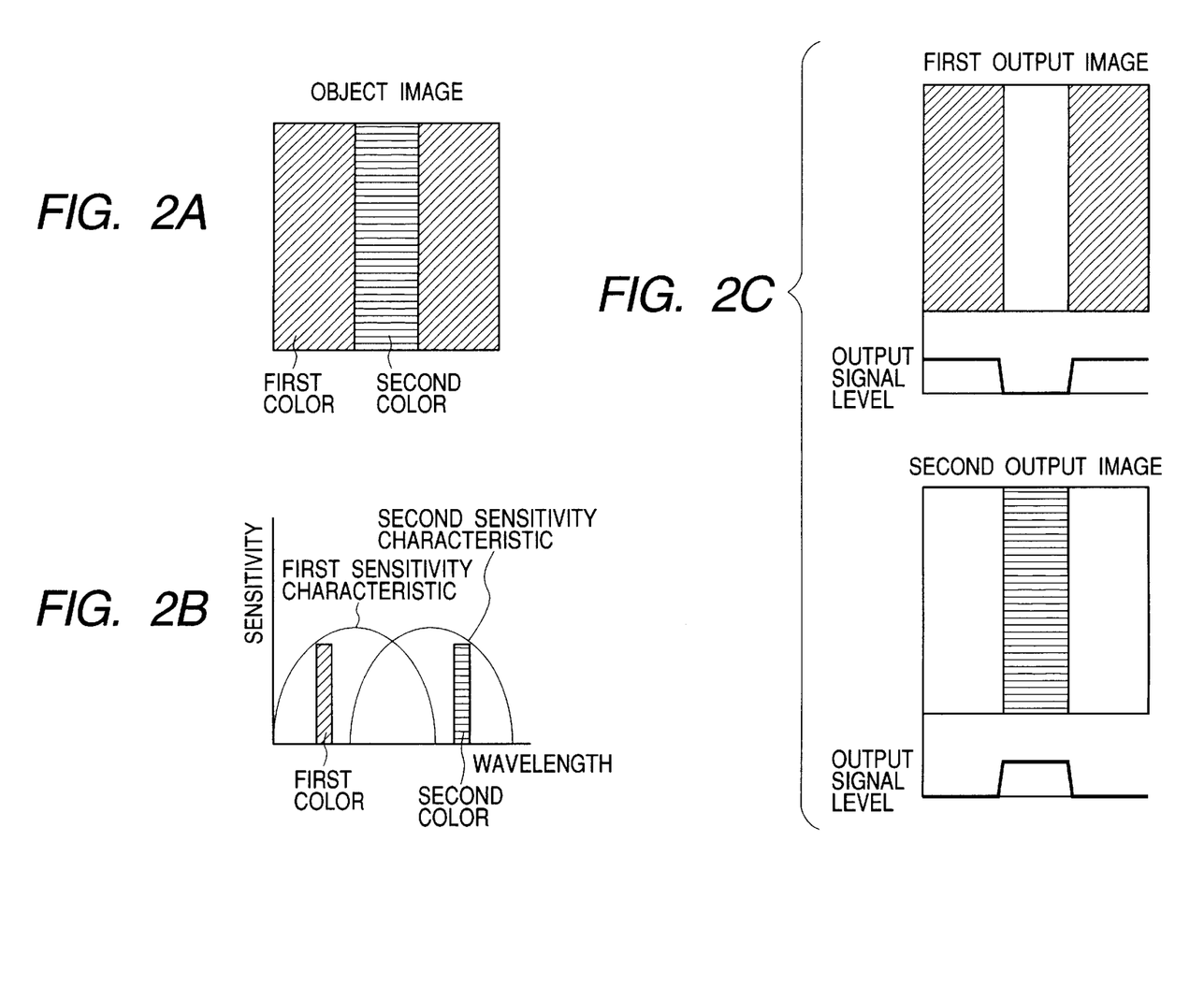
FIGS. 2A, 2B and 2C show several diagrams for explaining an effect of a first embodiment.

With reference to FIGS. 2A to 2C, the operation and the effect of these focus detection means having different sensitivity characteristics will be described below.

FIG. 2A shows the same object image example that is shown in FIG. 8 for describing the prior system. FIG. 2B shows the modeling of a first sensitivity characteristic and a second sensitivity characteristic which correspond to the sensitivity characteristics of the first and second focus detection means in this embodiment, respectively. FIG. 2C shows output images when the image of FIG. 2A is detected, to be obtained based on these two sensitivity characteristics.

A first output image shown in FIG. 2C has the first sensitivity characteristic that shows sensitivity to the first color. As shown in the drawing, an output signal is provided for the first color, but no sensitivity is shown to the second color with no output. However, the output signal exhibits such a distinct contrast that two images of different pupil positions can be correlated for excellent focus detection. Similarly, a second output image shown in FIG. 2C shows sensitivity to the second color rather than to the first color, resulting in the output as shown in the drawing. Also, in this case, the output signal exhibits such a distinct contrast that the output image is suitable for focus detection.

Therefore, it should be understood that, according to this embodiment, either of the first and second output images can be used for focus detection on an object image for which the focus detection cannot be performed by the prior system.

Figure 3:
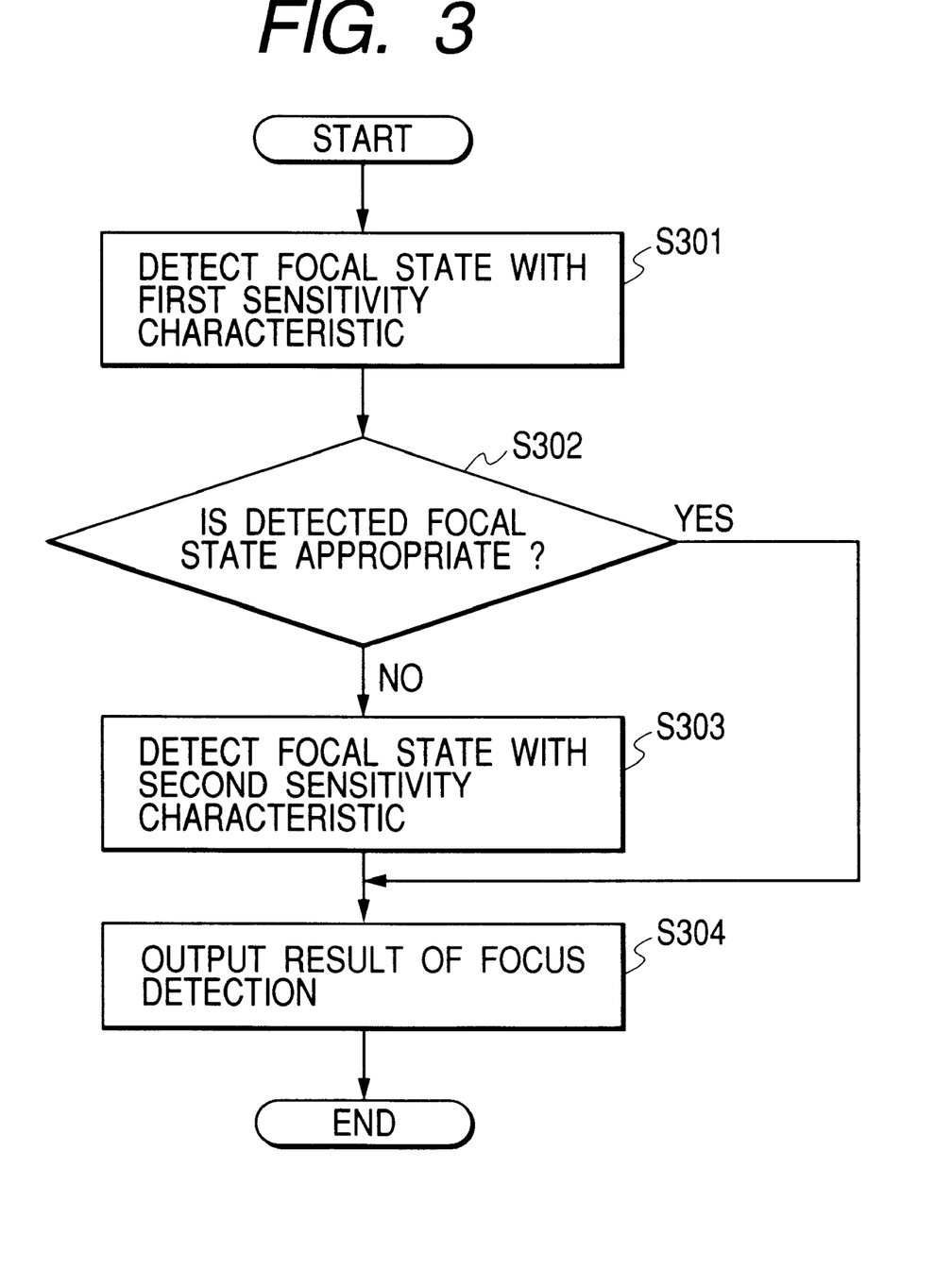
FIG. 3 is a flow chart for showing an operation of a major portion of the first embodiment.

Next, an approach to use the first focus detection result and the second focus detection result to obtain an optimal focus detection result will be described below with reference to a flow chart of FIG. 3.

At step S301, focus detection is performed with the first sensitivity characteristic. At the next step S302, a determination is made as to whether or not the focus detection result is appropriate. At this time, the determination may be made based on the contrast, output level, or correlation value of two images having different pupil positions. Furthermore, they may be compared with preset values. If the focus detection is appropriate, the process proceeds with step S304. If it is not appropriate, the process proceeds with step S303 to perform focus detection with the second sensitivity characteristic, and then proceeds with step S304. At this step S304, the focus detection result is provided as an output.

As described above, the two focus detection means having different sensitivity characteristics can be switched appropriately so that excellent focus detection results can be obtained at all times.

Second Embodiment

Figure 4:
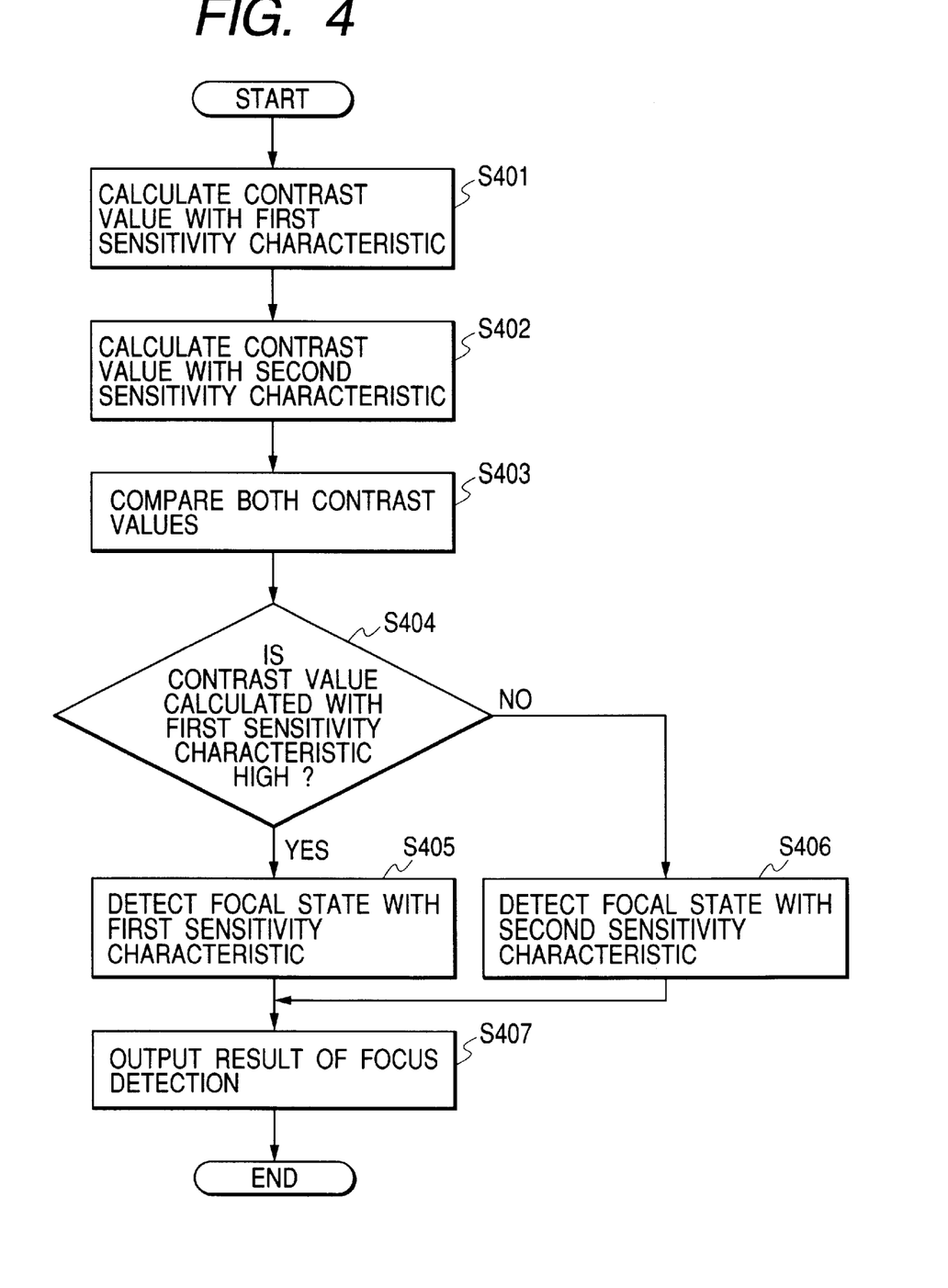
FIG. 4 is a flow chart for showing an operation of a major portion of a second embodiment.

FIG. 4 is a flow chart for showing an operation of a major portion of a second embodiment according to the present invention. It is assumed that this camera has a similar configuration to that of the first embodiment described above.

The second embodiment is configured to switch the first and second focus detection means having different sensitivity characteristics appropriately, depending on their respective contrast values.

At step S401 of FIG. 4, a contrast value in a predetermined field of view is calculated for each of or either one of two images from different pupil positions with the first sensitivity characteristic. The contrast calculation may be accomplished through any well-known technique or by obtaining a difference between the maximum and minimum values. Next, the process proceeds with step S402 to calculate a contrast value with the second sensitivity characteristic in a similar manner to that of step S401 described above. Then, the process proceeds to step S403 to compare the contrast values obtained at steps S401 and S402 described above to select focus detection means producing a higher contrast. At the following step S404, a determination is made as to whether the image with the first sensitivity characteristic has a higher contrast, based on the comparison result of step S403 described above. The process proceeds with step S405 if it is higher or with step S406 if it is lower (that is, the image with the second sensitivity characteristic has a higher contrast).

When the process proceeds with step S405, a focus detection calculation is performed with the first sensitivity characteristic and then the process proceeds with step S407. When the process proceeds with step S406, a focus detection calculation is performed with the second sensitivity characteristic and then the process also proceeds with step S407. At step S407, a focus detection result of higher contrast selected from those obtained with the first and second sensitivity characteristics is provided as an output.

This operation can allow for selection of higher contrast focus detection so that the focus detection can be performed accurately to provide excellent stable focus detection results at all times.

Third Embodiment

Figure 5:
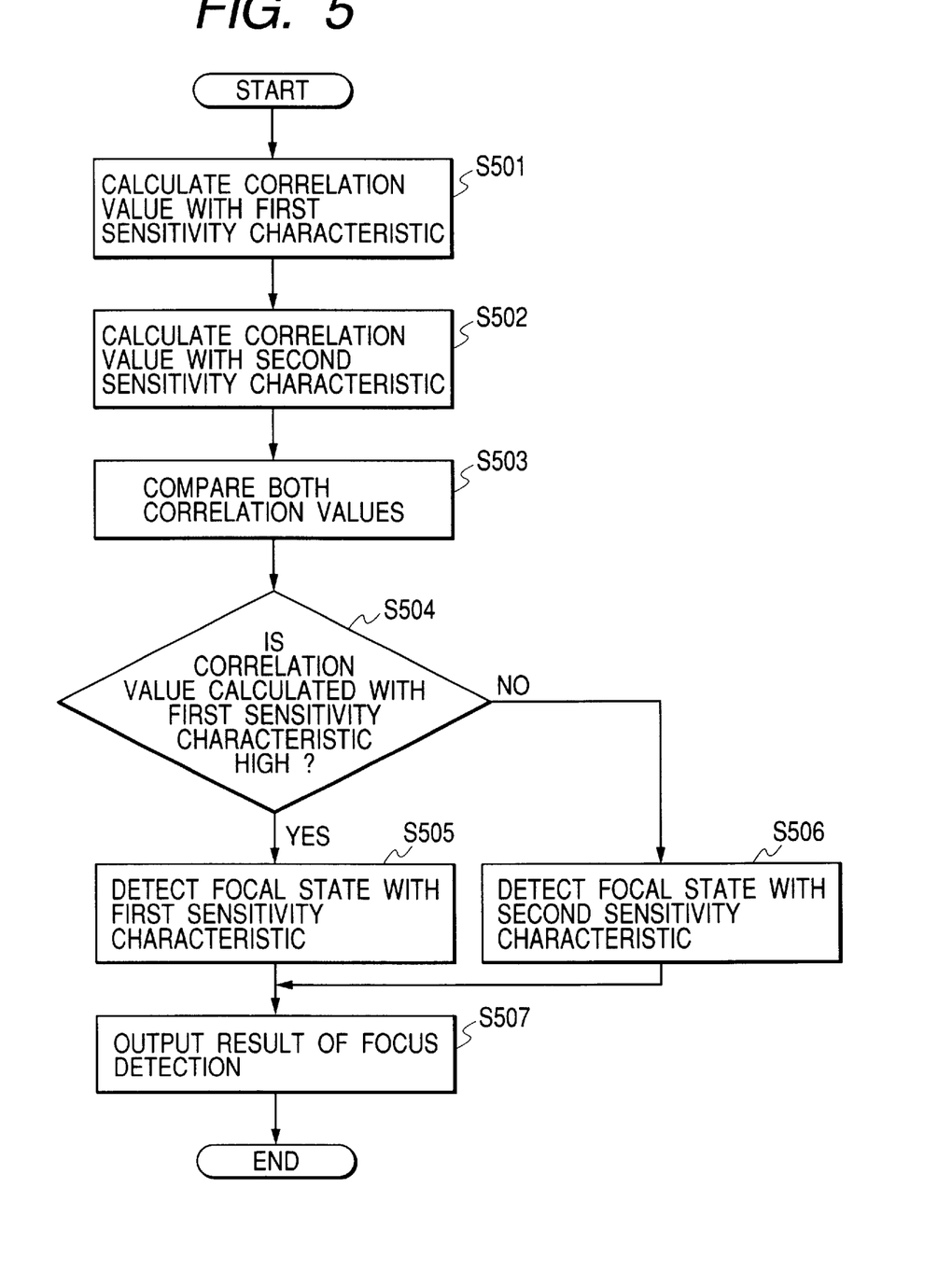
FIG. 5 is a flow chart for showing an operation of a major portion of a third embodiment.

FIG. 5 is a flow chart for showing an operation of a major portion of a third embodiment according to the present invention. It is assumed that this camera has a similar configuration to that of the first embodiment described above.

This third embodiment is configured to switch the first and second focus detection means having different sensitivity characteristics appropriately, depending on a correlation value of two images from different pupil positions.

At step S501 of FIG. 5, a correlation value is calculated for two images from different pupil positions with the first sensitivity characteristic. The correlation value calculation may be accomplished through any well-known technique or by using the degree of matching between two images. Next, the process proceeds with step S502 to calculate a correlation value with the second sensitivity characteristic in a similar manner to that of step S501 described above. Then, the process proceeds to step S503 to compare the correlation values obtained at steps S501 and S502 described above to select focus detection means producing a higher correlation value. At the following step S504, a determination is made based on the comparison result of step S503 described above. If the image with the first sensitivity characteristic has a higher value of correlation between the two images from different pupil positions, the process proceeds with step S505. Otherwise (that is, if the image with the second sensitivity characteristic has a higher correlation value), the process proceeds with step S506.

When the process proceeds with step S505, a focus detection calculation is performed with the first sensitivity characteristic and then the process proceeds with step S507. When the process proceeds with step S506, a focus detection calculation is performed with the second sensitivity characteristic and then the process also proceeds with step S507. At step S507, a focus detection result of higher correlation selected from those obtained with the first and second sensitivity characteristics is provided as an output.

This operation can allow for selection of higher correlation focus detection so that the focus detection can be performed accurately to provide excellent stable focus detection results at all times.

According to the embodiments described above, at least two focus detection means having different sensitivity characteristics are switched appropriately to perform focus detection, so that the present invention can produce a high-contrast object image at all times, irrespective of color of an object, thereby allowing for excellent focus detection. In order to achieve this, in the first embodiment, if the first focus detection means cannot perform focus detection, the system is switched to use another focus detection means, and in the second embodiment, image contrasts from these focus detection means are compared with each other to switch them based on the comparison result, and in the third embodiment, correlation values of two images with these focus detection means are compared with each other to switch them based on the comparison result.

In the second and third embodiments, focus detection may be performed at respective light receiving sensors to make a comparison depending on the resulting contrast information or correlation calculation values.

The above-mentioned embodiments have been described for the case of two pupil-split images, but the present invention is not limited to this case and the number of images used may be two or more. Alternatively, at least two or more images with a parallax may be used for focus detection.

The above-mentioned embodiments have been described in the context of a camera which comprises two focus detection means having different sensitivity characteristics, but more than two focus detection means may be used and these means may also apply to other optical equipment than such a camera. In a digital camera wherein a CCD or C-MOS is used as an image taking element, the image taking element for recording an object image may double as the focus detection device/distance measurement device in the above-mentioned embodiments.

In the above-mentioned embodiments, the sensitivity wavelength regions for the sensors are substantially identical, as shown in FIG. 2, but these wavelength regions may have different widths. In the latter case, it is desirable that focus detection means with a narrower sensitivity wavelength region is first used for focus detection and if that means cannot perform focus detection, another focus detection means with a wider sensitivity wavelength region is used.

Moreover, it is needless to say that, when at least two or more images with a parallax are used, the above-mentioned focus detection means may be replaced by at least two distance measurement devices (devices for measuring the distance to an object) having different sensitivity characteristics to provide similar effects.

As described above, the above-mentioned embodiments can provide a focus detection device and a distance measurement device which provide the ability to obtain a high-contrast object image and to perform excellent focus detection or distance measurement operations at all times.

What is claimed is:

1. A focus detection device, comprising:

light receiving sensors of which sensible wave length regions are different from each other and in which at least part of the sensible wave length regions overlap each other;

a focus detection circuit which performs focus detection based on an output of any one of the light receiving sensors; and a determination circuit which determines whether or not the focus detection result is appropriate, wherein if the determination circuit determines that the result is not appropriate, the focus detection circuit performs focus detection based on the output of another light receiving sensor of the light receiving sensors.

2. The focus detection device according to claim 1, wherein the determination circuit uses the output level of the light receiving sensor used for the focus detection to make the determination.

3. The focus detection device according to claim 1, wherein the determination circuit uses the output contrast of the light receiving sensor used for the focus detection to make the determination.

4. The focus detection device according to claim 1, further comprising:

pupil-split members which cause object images to be received on each of the light receiving sensors, wherein the focus detection circuit performs a correlation calculation on the object images and the determination circuit uses the output correlation value of the light receiving sensor used for the focus detection to make the determination.

5. A focus detection device, comprising:

light receiving sensors of which sensible wave length regions are different from each other and in which at least part of the sensible wave length regions overlap each other;

a comparison circuit which compares output signals from the light receiving sensors;

a selection circuit which selects the output from one of the light receiving sensors to be used for focus detection, depending on the comparison result; and a focus detection circuit which performs focus detection in accordance with the output of the selected light receiving sensor.

6. The focus detection device according to claim 5, wherein the comparison circuit compares the output levels of the light receiving sensors.

7. The focus detection device according to claim 5, wherein the comparison circuit compares the output contrasts of the light receiving sensors.

8. The focus detection device according to claim 5, further comprising:

pupil-split members which cause object images to be received on each of the light receiving sensors, wherein the comparison circuit compares correlation values for the object images of the light receiving sensors.

9. A focus detection device, comprising:

light receiving sensors of which sensible wave length regions are different from each other and in which at least part of the sensible wave length regions overlap each other;

a selection circuit which compares with each other correlation values for pupil-split images obtained from the outputs of the light receiving sensors or images with a parallax obtained from the outputs of the light receiving sensors to select a light receiving sensor of a higher correlation value; and a focus detection circuit which performs focus detection in accordance with the output of the selected light receiving sensor.

10. A distance measurement device, comprising:

light receiving sensors of which sensible wave length regions are different from each other and in which at least part of the sensible wave length regions overlap each other;

a distance measurement circuit which performs distance measurement based on the correlation among pupil-split images obtained from the output of any one of the light receiving sensors or among images with a parallax obtained from the output; and a determination circuit which determines whether the distance measurement result is appropriate, wherein if the determination circuit determines that the result is not appropriate, the distance measurement circuit performs distance measurement based on the output of another light receiving sensor of the light receiving sensors.

11. The distance measurement device according to claim 10, wherein the determination circuit uses the output level of the light receiving sensor used for the distance measurement to make the determination.

12. The distance measurement device according to claim 10, wherein the determination circuit uses the output contrast of the light receiving sensor used for the distance measurement to make the determination.

13. The distance measurement device according to claim 10, wherein the determination circuit uses the output correlation value of the light receiving sensor used for the distance measurement to make the determination.

14. A distance measurement device, comprising:
light receiving sensors of which sensible wave length regions are different from each other and in which at least part of the sensible wave length regions overlap each other;
a comparison circuit which compares output signals from the light receiving sensors;
a selection circuit which selects the output from one of the light receiving sensors to be used for distance measurement, depending on the comparison result; and
a distance measurement circuit which performs distance measurement in accordance with the correlation among pupil-split images obtained from the output of the selected light receiving sensor or among images with a parallax obtained from the output.

15. The distance measurement device according to claim 14, wherein the comparison circuit compares the output levels of the light receiving sensors.

16. The distance measurement device according to claim 14, wherein the comparison circuit compares the output contrasts of the light receiving sensors.

17. The distance measurement device according to claim 14, wherein the comparison circuit compares the output correlation values of the light receiving sensors.

18. A distance measurement device, comprising:
light receiving sensors of which sensible wave length regions are different from each other and in which at least part of the sensible wave length regions overlap each other;
a selection circuit which compares with each other correlation values for pupil-split images obtained from the outputs of the light receiving sensors or images with a parallax obtained from the outputs of the light receiving sensors to select a light receiving sensor of a higher correlation value; and
a distance measurement circuit which performs distance measurement in accordance with the correlation among the pupil-split images obtained from the output of the selected light receiving sensor.

19. A focus detection device, comprising:
light receiving sensors of which sensible wave length regions are different from each other and in which at least part of the sensible wave length rcgi ens overlap each other;
a selection circuit which compares with each other correlation values for images with a parallax obtained from the outputs of the light receiving sensors to select a light receiving sensor of a higher correlation value; and
a focus detection circuit which performs focus detection in accordance with the output of the selected light receiving sensor.

20. A distance measurement device, comprising:
light receiving sensors of which sensible wave length regions are different from each other and in which at least part of the sensible wave length regions overlap each other;
a distance measurement circuit which performs distance measurement based on the correlation among image with a parallax obtained from the output of any one of the light receiving sensors; and
a determination circuit which determines whether the distance measurement result is appropriate,
where in the determination circuit determines that the result is not appropriate, the distance measurement circuit performs distance measurement based on the output of another light receiving sensor of the light receiving sensors.

21. The distance measurement device according to claim 20, wherein the determination circuit uses the output level of the light receiving sensor used for the distance measurement to make the determination.

22. The distance measurement device according to claim 20, wherein the determination circuit uses the output contrast of the light receiving sensor used for the distance measurement to make the determination.

23. The distance measurement device according to claim 20, wherein the determination circuit uses the output correlation value of the light receiving sensor used for the distance measurement to make the determination.

24. A distance measurement device, comprising:
light receiving sensors of which sensible wave length region are different from each other and in which at least part of the sensible wave length regions overlap each other;
a comparison circuit which compares output signals from the light receiving sensors;
a selection circuit which selects the output from one of the light receiving sensors to be used for distance measurement, depending on the comparison result; and
a distance measurement circuit which performs distance measurement in accordance with the correlation among images with a parallax obtained from the output of the selected light receiving sensor.

25. The distance measurement device according to claim 24, wherein the comparison circuit compares the output levels of the light receiving sensors.

26. The distance measurement device according to claim 24, wherein the comparison circuit compares the output contrasts of the light receiving sensors.

27. The distance measurement device according to claim 24, wherein the comparison circuit compares the output correlation values of the light receiving sensors.

28. A distance measurement device, comprising:
light having sensors of which sensible wave length regions an different from each other and in which at least part of the sensible wave length regions overlap each other;
a selection circuit which compares with each other correlation values for images with a parallax obtained from the outputs of the light receiving sensors to select a light receiving sensor of a higher correlation value; and
a distance measurement circuit which performs distance measurement in accordance with the correlation among the images with a parallax obtained from the output of the selected light receiving sensor.

29. A focus detection device, comprising: light receiving sensors of which sensible wave length regions are different from each other and in which at least part of the sensible wave length regions overlap each other.
a focus detection circuit which performs focus detection based on an output of any one of said light receiving sensors; and a processing circuit which, in the case that the output of one of said light receiving sensors used by said detection circuit does not satisfy a preset value, causes said focus detection circuit to perform focus detection by using the output of another of said light receiving sensors.

30. The focus detection device according to claim 29, wherein said processing circuit compares the output level of the light receiving sensor used for the focus detection with a preset value.

31. The focus detection device according to claim 29, wherein said processing circuit compares the output contrast of the light receiving sensor used for the focus detection with a preset value.

32. The focus detection device according to claim 29, further comprising:
pupil-split members which cause object images to be received on each of said light receiving sensors,
wherein said processing circuit compares the output correlation value of the light receiving sensor used the focus detection with a preset value.

33. A focus detection device, comprising:
light receiving sensors of which sensible wave length regions are different from each other and in which at least part of the sensible wave length regions overlap each other;
a processing circuit which compares output signals from said light receiving sensors and selects a light receiving sensor to be used for focus detection in accordance with the comparison result; and
a focus detection circuit which performs focus detection in accordance with the output of the selected light receiving sensor.

34. A distance measurement device, comprising:
light receiving sensors of which sensible wave length regions are different from each other and in which at least part of the sensible wave length regions overlap each other;
a distance measurement circuit which performs distance measurement based on the correlation among pupil-split images obtained from the output of any one of said light receiving sensors; and
a processing circuit which, in the case that the output of one of said light receiving sensors used by said distance measurement circuit does not satisfy a preset value, causes said distance measurement circuit to perform distance measurement by using the output of another of said light receiving sensors.

35. The distance measurement device according to claim 34, wherein said processing circuit compares the output level of the light receiving sensor used for the distance measurement with a preset value.

36. The distance measurement device according to claim 34, wherein said processing circuit compares the output contrast of the light receiving sensor used for the distance measurement with a preset value.

37. The distance measurement device according to claim 34, wherein said processing circuit compares the output correlation value of the light receiving sensor used for the distance measurement with a preset value.

38. An image taking device, comprising:
light receiving sensors of which sensible wave length regions are different from each other and in which at least part of the sensible wave length regions overlap each other;
a focus detection circuit which performs focus detection based on an output of any one of said light receiving sensors; and
a processing circuit which, in the case that the output of one said light receiving sensors used by said focus detection circuit does not satisfy a preset value, causes said focus detection circuit to perform focus detection by using the output of another of said light receiving sensors.

39. An image taking device, comprising:
light receiving sensors of which sensible wave length regions are different from each other and in which at least part of the sensible wave length regions overlap each other;
a processing circuit which compares output signals from said light receiving sensors and selects a light receiving sensor to be used for focus detection in accordance with the comparison result; and
a focus on circuit which performs focus detection in accordance with the output of the selected light receiving sensor.

40. An image taking device, comprising:
light receiving sensors of which sensible wave length regions are different from each other and in which at least part of the sensible wave length regions overlap each other;
a selection circuit which compares with each other correlation values for pupil-split images obtained from the outputs of said light receiving sensors to select a light receiving sensor of a higher correlation value; and
a focus detection circuit which performs focus detection in accordance with the output of the selected light receiving sensor.

41. An image taking device, comprising:
light receiving sensors of which sensible wave length regions are different from each other and in which at least part of the sensible wave length regions overlap each other;
a distance measurement circuit which performs distance measurement based on the correlation among pupil-split images obtained from the output of any one of said light receiving sensors; and
a processing circuit which, in the case that the output of one of said light receiving sensors used by said distance measurement circuit does not satisfy a preset value, causes said distance measurement circuit to perform distance measurement by using the output of another of said light receiving sensors.

42. An image taking device, comprising:
light receiving sensors of which sensible wave length regions are different from each other and in which at least part of the sensible wave length regions overlap each other;
a selection circuit which compares with each other correlation values for pupil-split images obtained from the outputs of said light receiving sensors to select a light receiving sensor of a higher correlation value; and
a distance measurement circuit which performs distance measurement in accordance with the correlation among the pupil-split images obtained from the output of the selected light receiving sensor.

43. A distance measurement device, comprising:
light receiving sensors of which sensible wave length regions are different from each other and in which at least part of the sensible wave length regions overlap each other;
a distance measurement circuit which performs distance measurement based on the correlation among images with a parallax obtained from the output; and a processing circuit which, in the case that the output of one of said light receiving sensors used by said distance measurement circuit does not satisfy a preset value, cause said distance measurement circuit to perform distance measurement by using the output of another of said light receiving sensors.

44. The distance measurement device according to claim 43, wherein said processing circuit the output level of the light receiving sensor used for the distance measurement with a preset value.

45. The distance measurement device according to claim 43, wherein said processing circuit compares the output contrast of the light receiving sensor used for the distance measurement with a preset value.

46. The distance measurement device according to claim 43, wherein said processing compares the output correlation value of the light receiving sensor used for the distance measurement with a preset value.

47. An image taking device, comprising:

light receiving sensor of which sensible wave length regions are different form each other and in which at least part of the sensible wave length regions overlap each other;

a distance measurement circuit which performs distance measurement based on the correlation among image with a parallax obtained from the output; and a processing circuit which, in the case that the output of one of said light receiving sensors used by said distance measurement circuit does not satisfy a preset value, causes said distance measurement circuit to perform distance measurement by using the output of another of said light receiving sensors.

* * * * *

UNITED STATES PATENT AND TRADEMARK OFFICE
CERTIFICATE OF CORRECTION

PATENT NO. : 6,636,699 B2
DATED : October 21, 2003
INVENTOR(S) : Mitsuru Owada

It is certified that error appears in the above-identified patent and that said Letters Patent is hereby corrected as shown below:

Column 8,
Lines 41-43, "or images with a parallax obtained from the outputs of the light receiving sensors" should be deleted.
Lines 56-57, "or among images with a parallax obtained from the output" should be deleted.

Column 9,
Lines 23-24, "or among images with a parallax obtained from the output" should be deleted.
Lines 41-43, "or images with a parallax obtained from the outputs of the light receiving sensors" should be deleted.
Line 52, "rcgi ens" should read -- regions --.

Column 10,
Line 2, "image" should read -- images --.
Line 7, "where in" should read -- wherein if --.
Line 47, "having" should read -- receiving --.
Line 48, "an" should read -- are --.
Line 60, "comprising: light" should read -- comprising:
     light --.

Column 11,
Line 2, "used by said" should read -- used by said focus --.
Line 19, "used the" should read -- used for the --.

Column 12,
Line 16, "focus on" should read -- focus detection --.

Column 13,
Line 4, "cause" should read -- causes --.
Line 8, "circuit" should read -- circuit compares --.

UNITED STATES PATENT AND TRADEMARK OFFICE
CERTIFICATE OF CORRECTION

PATENT NO.      : 6,636,699 B2
DATED           : October 21, 2003
INVENTOR(S)    : Mitsuru Owada It is certified that error appears in the above-identified patent and that said Letters Patent is hereby corrected as shown below:

<u>Column 14,</u>
Line 2, "sensor" should read -- sensors --.
Line 8, "image" should read -- images --.

Signed and Sealed this

Twenty-third Day of March, 2004

JON W. DUDAS
*Acting Director of the United States Patent and Trademark Office*